United States Patent [19]
McMullen

[11] 3,769,921
[45] Nov. 6, 1973

[54] WASTE MATERIALS PROCESSING SYSTEM

[76] Inventor: Frederick G. McMullen, Gwynedd Valley, Pa.

[22] Filed: Dec. 27, 1971

[21] Appl. No.: 212,270

[52] U.S. Cl. .................. 110/8 R, 110/10, 110/15
[51] Int. Cl. ............................................. F23g 5/00
[58] Field of Search .................. 110/7, 8 R, 10, 11, 110/15

[56] References Cited
UNITED STATES PATENTS

| | | | |
|---|---|---|---|
| 3,322,079 | 5/1967 | Komline | 110/8 |
| 3,031,982 | 5/1967 | Gordon et al. | 110/8 |
| 3,471,369 | 10/1969 | Cox et al. | 110/10 X |
| 3,647,405 | 3/1972 | Smith | 110/8 |
| 3,622,508 | 11/1971 | Komline | 110/8 |
| 3,559,596 | 2/1971 | Isbii | 110/15 |
| 3,533,365 | 10/1970 | Tanner et al. | 110/15 |
| 3,587,488 | 6/1971 | Mutke et al. | 110/15 |
| 3,362,887 | 1/1968 | Rodgers | 110/11 |

*Primary Examiner*—Kenneth W. Sprague
*Attorney*—Allan Ratner

[57] ABSTRACT

A waste materials processing system and method for combusting solid waste material on grates in combination with comminuted waste material being combusted in suspension within a combustion zone. Conduits are positioned external to the combustion zone around which exhaust gases from the combustion zone pass. Comminuted waste material is driven through the conduits and by pyrolytic action emit gases which are collected and passed to a recovery system. Additionally, pre-dried sludge and sludge vapors derived from sanitary sewage are incorporated into the combustion zone for burning. The combined waste materials processing system may be incorporated within a steam generating system in order to increase the overall efficiency of the boiler.

26 Claims, 3 Drawing Figures

WASTE MATERIALS PROCESSING SYSTEM

BACKGROUND OF THE INVENTION

1. Field of the Invention

This invention relates to the field of processing waste materials. In particular, this invention pertains to the field of combusting waste materials within boiler systems.

2. Prior Art

Prior systems and methods for processing waste materials are known. Some of the prior systems have included incineration of solid waste materials. A problem of only incinerating solid waste materials is the requirement of excess air needed in the burning zone. The excess air provided to promote combustion results in a relatively high particulate emission from the combusting solid waste material.

Prior systems for processing waste materials have included suspension burning of comminuted waste materials. The problem of suspension burning alone is that although a controlled burning may be accomplished, the heat release from the suspension burning is found to be less than optimum.

Further, prior systems do incinerate sludge, derived from sanitary sewage, in a combustion zone. However, such systems only incorporate the sludge in combination with the incineration of solid waste materials or the suspension burning of comminuted waste material. When the incorporated sludge is combined with incineration or suspension burning, such results in a less than optimum heat release from the combusted materials.

Prior systems are known in which pyrolysis is accomplished on waste materials. However, such systems often times use their own volatiles as fuel to produce heat. This results in a complex and expensive operation. In other systems, the heat needed for the pyrolytic action is created external to and separate from the pyrolysis system necessitating the expense of added fuel and other operating systems.

SUMMARY OF THE INVENTION

A method of processing waste materials which includes the step of introducing solid waste material into a combustion zone. A suspension of comminuted waste material is introduced into the combustion zone. The suspended waste material and solid waste material is subjected to heat of combustion within the combustion zone.

DESCRIPTION OF THE PREFERRED EMBODIMENT

Figure 1:
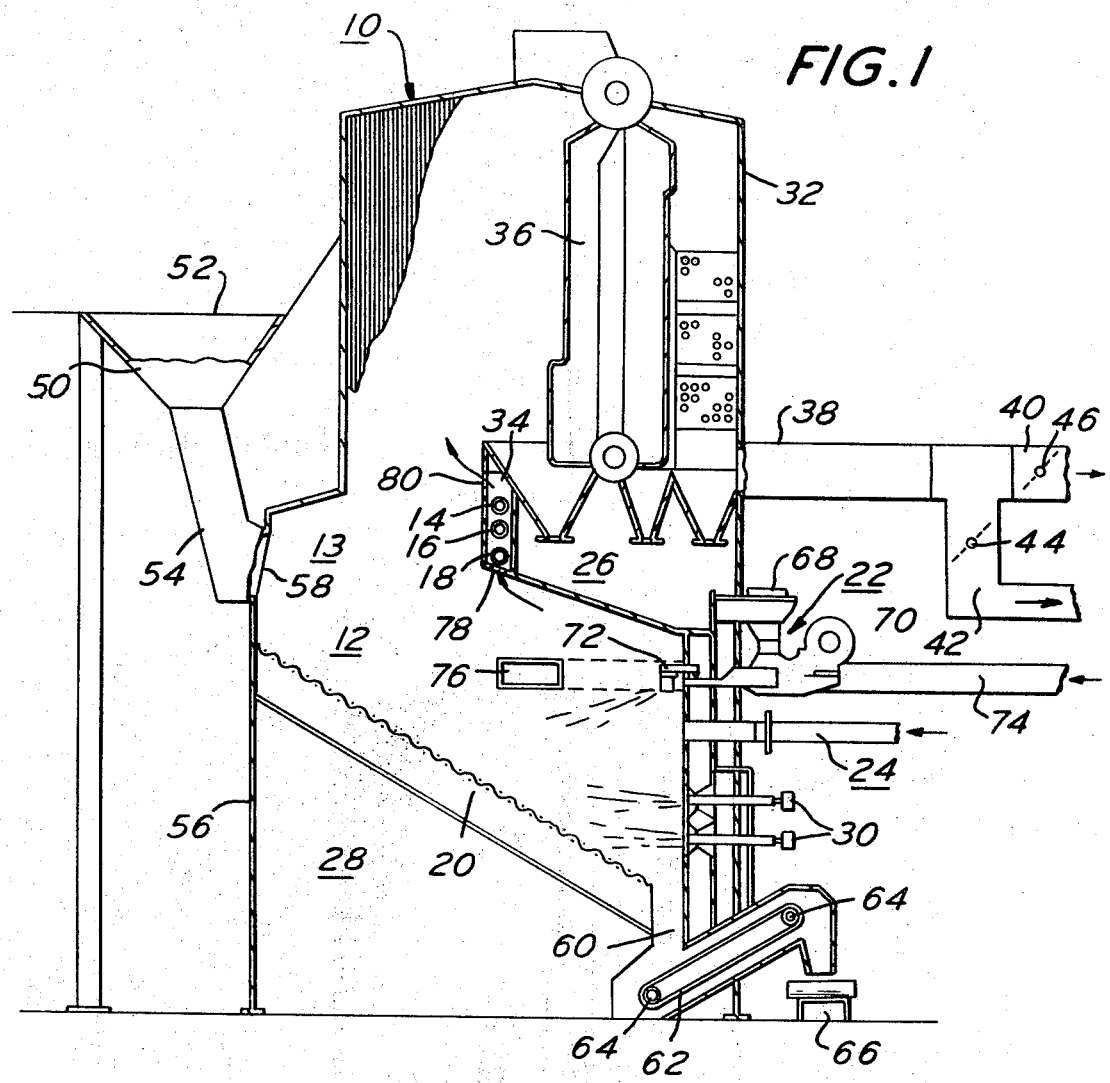
FIG. 1 is a cross-sectional drawing of a steam generating unit containing the waste materials processing system.
Figure 2:
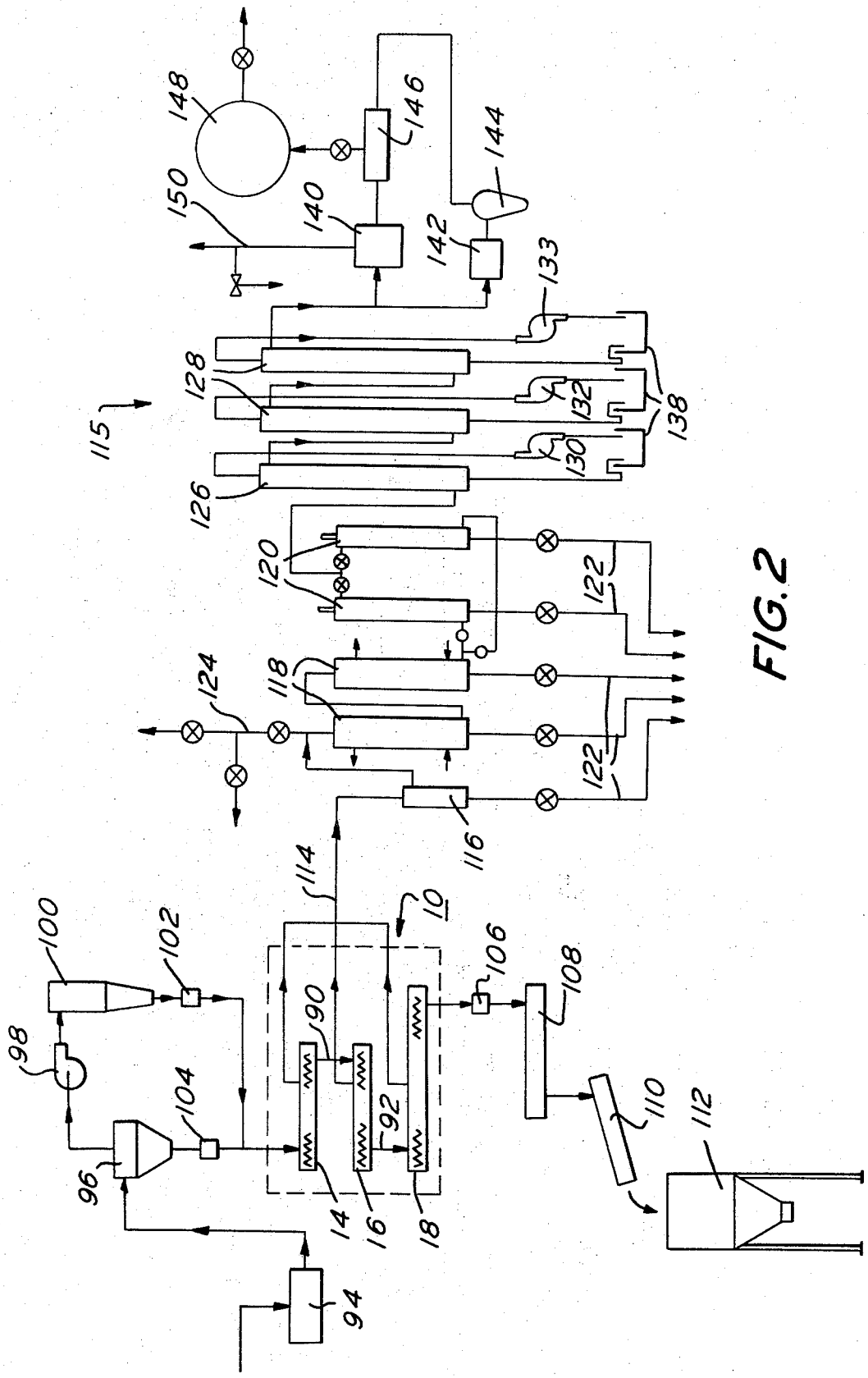
FIG. 2 is a flow diagram, schematically representing the pyrolysis system within the boiler combustion chamber and the pyrolytic recovery system; and, FIG. 3 is a perspective drawing, partially fragmented, showing a portion of a pyrolytic tubular conduit with a waste material driving mechanism located within the conduit.

Referring now to FIG. 1, there is shown a schematic diagram of a steam generator 10 which details the method and apparatus of combined combustion of solid waste material and comminuted waste material through grate and suspension burning respectively. Additionally, high gas temperatures that are produced within combustion zone 12 are utilized to heat a plurality of retorts 14, 16 and 18 contained within secondary zone 13, which promotes pyrolytic action on the comminuted waste material contained therein. Resulting gases are drawn off into recovery system 115 as shown in FIG. 2.

In general, the combustion system and method as herein described includes the combined combustion of trash in trash form on grate mechanisms 20 and the burning of pulverized or comminuted solid waste fuel through suspension burning mechanism 22. This combined combustion may be coupled with the input of pre-dried sludge passing from a flash dryer into combustion zone 12 through sludge burning mechanism 24. The combined combustion methods of burning trash in trash form on grates 20 and pulverized waste in suspension along with sludge derived from sanitary sewage results in the maintenance of a substantially self-sustaining burning operation. Further, the combustion of the aforementioned materials is accelerated over that found when only one or the other type of burning is used which results in an overall increased efficiency of steam generating unit 10. Waste products of combustion passing from combustion zone 12 may be further utilized by passing through pyrolysis system 26 which produces valuable by-products in recovery system 115, schematically represented in FIG. 2.

Steam generator 10 as shown in FIG. 1 represents a modified water tube type boiler unit. In general, combined suspension and grate burning coupled with pyrolytic actuation of processed waste may be accomplished in a multiplicity of boiler types or even without an enclosing chamber; however, the water tube type boiler as schematically drawn presents a representation where the inventive concept as herein detailed may be fully described. In general operation, waste products are burned on grate mechanism 20 and within combustion region 12 through spray suspension burning mechanism 22 and dry sludge burning mechanism 24. Air may be incorporated into boiler combustion zone 12 or in lower fire zone 28 which contains fuel for burning the solid waste within combustion zone 12. Auxiliary fuel such as oil or gas may be incorporated into zone 12 of steam generator 10 through auxiliary fuel input mechanisms 30 passing through forward side wall 32 of stem generator 10 as is shown in FIG. 1. Although not important to the inventive concept as herein described, input mechanisms 30 provide oil or gas auxiliary fuel for initial lighting off of the steam generator and as a stand-by in case of fuel failure within zone 12.

The hot waste or exhaust gases pass through pyrolysis system 26 which includes plenum chamber 34 and has incorporated therein retorts or conduits 14, 16 and 18. Gases leaving plenum chamber 34 are directed through boiler bank 36 for generating steam which may be used in heating, cooling, power generation or some like process not important to the inventive concept. The gases then pass through tubular air heater into boiler exit conduit 38 which passes through forward side wall 32 and is positioned to receive the waste or exhaust gases after the gases have passed through boiler tube bank 36. Gases may then pass into electrostatic precipitator through conduit 40 or other purifying device where the gases are purified somewhat before expulsion to the atmosphere. Additionally, the gases may enter sludge flash dryer conduit 42 for recycling to a flash dryer (not shown) which dries the sludge to an approximately 15% moisture content and then recycles the dried sludge back through burning mechanism 24 into steam generator 10 within zone 12 for continued burning. The percentage of gases passing into conduits 40 and 42 may be controlled by dampening valves 46 and 44 and such may be automatically set or manually controlled by an operator.

Trash in trash form is received from refuse trucks or by other means and loaded into charging hopper 50 through hopper opening 52 as is shown. The material passes through hopper conduit 54 by gravity assist and into combustion region 12 through rear wall 56 of steam generator 10. The material passes to the upper surface of incinerator grates 20 which may include a plurality of openings such as pin holes to permit the emission of forced air draft from lower fire zone 28 to aid in the material burning on moving grate mechanism 20. Such moveable grate mechanisms 20 are well known in the art and are not part of the inventive concept. The material passing through wall opening 58 and dropping to grate mechanism 20 is gradually directed to a lowermost opening 60 passing adjacent to forward sidewall 32 in a vertically directed downward manner. In movement from an uppermost portion of grate mechanism 20 to wall opening or lowermost opening 60, the material is burned throughout its inclined, downwardly directed travel. The material residual passing from lowermost opening 60 is directed onto endless conveyor belt 62 which is driven through sprocket or pulley mechanism 64 to pass the residual to belt conveyor 66 for oxidized metal recovery from the residual.

The material combusted on the grates 20 include trash in trash form having approximate densities of 14–16 lbs. per cubic foot. In the combination of suspension and grate burning, the temperatures found in combustion zone 12 may reach approximately 1,500°–2,000° F. The temperatures within combustion zone 12 are controlled by over-fire air and under-fire air to maintain a predetermined temperature level. The temperatures achieved in secondary zone 13 are usually somewhat less than those in combustion zone 12. Pyrolysis occurring within conduits 14, 16 and 18 may be controlled by dampening and by restricting and defining parametric variables such as flow rate, material composition, definition and exhaust gas temperatures.

Pulverized solid waste fuel passes into suspension burning mechanism 22 through suspension burning hopper 68. Fuel blower 70 passes air under pressure through a venturi and carries with it fuel from hopper 68 into boiler 10 through forward side wall 32 as is shown. The air and fuel impinges on spreader 72 which disperses the mixture in a spray pattern in fan fashion over grate 20. Where the area of grate 20 can not be encompassed by one suspension burning mechanism 22, it is obvious that a plurality of mechanisms 22 may be used side by side in order to obtain the necessary coverage. Injector or suspension burning mechanism 22, which is well known in the art, may be pneumatically operated and controlled by an air-fuel ratio instrumentation which is preferably sensitive from a master control from the main steam supply line from the steam generator. The pulverized solid waste having a density of approximately 16–20 lbs. per cubic foot and with a moisture content of approximately 20–25 percent is injected pneumatically into combustion zone 12 in such a manner that approximately 80 percent burns in suspension and 20 percent falls to the uppermost surface of grate 20 and is thereon combusted. Where air is supplied beneath grates 20 in lower fire zone or plenum chamber 28, it is used primarily for combustion of the heavier particles upon grate 20. The necessary combustion air which is used in burning in suspension is introduced and controlled by fuel blower 70 of fuel injector or suspension burning mechanism 22.

In addition to the burning of trash in trash form on grates 20 and the suspension burning of the pulverized material through injector mechanism 22, substantially dry sludge having approximately a 15 percent moisture content is received from the flash dryer (not shown) and is pneumatically injected into combustion zone 12 of steam generator 10. The pre-dried sludge passes through sludge input burning mechanism 24 through forward side wall 32 of steam generator 10 and into the combustion zone 12. Pneumatically driven mechanisms of this type are well-known in the art. As has been described, exhaust heat is available for flash drying and a deodorization process may be accomplished by recirculating the gases into combustion zone 12 through sludge vapor return conduit 74 into combustion zone 12 through vapor return opening 76, as is shown.

The sludge drying system may be of the CE Raymond type or some like means not important to the invention. In such a system, the wet sludge is usually delivered to a vacuum filter. The filter cake produced is discharged by gravity onto a belt conveyor or some other means which transfers the material to a double-paddle mixer of the flash drying system. The mixer is generally used to diminish the moisture in the sludge by mixing it with a portion of previously dried sludge solids from the cyclone separator. This generally has the effect of eliminating any adhering qualities as well as blending the moisture over the entire mass of material. The material is then discharged generally into a cage mill. This cage mill receives hot waste gases from steam generator 10 and creates enough turbulence so that fine particles of the mix are dispersed into the hot gas stream. In this manner, the sludge is dried in rapid fashion in route to the cyclone separator. The dried sludge may then be discharged through some air lock or other such means to a divider which may then proportion the amount of material going to the paddle mixer and also into combustion zone 12 through sludge vapor return conduits 74 and vapor return opening 76 located in combustion zone 12 of steam generator 10.

A portion of the pulverized solid waste fuel passing into suspension burning mechanism 22 is diverted into pyrolysis system 26 as is shown in FIG. 1. System 26 comprises a plurality of pyrolysis retorts 14, 16 and 18 which are positioned within plenum chamber 34 to allow passage of exhaust gases contiguous to the walls of the retorts. Waste gases pass into system 26 through pyrolysis system gas entrance or dampered opening 78, around the walls 82 of retorts 14, 16 and 18 and then exit through pyrolysis system gas exit dampered opening 80 for passage through boiler bank 36 and eventually into boiler exit conduit 38 as has been described.

Figure 3:
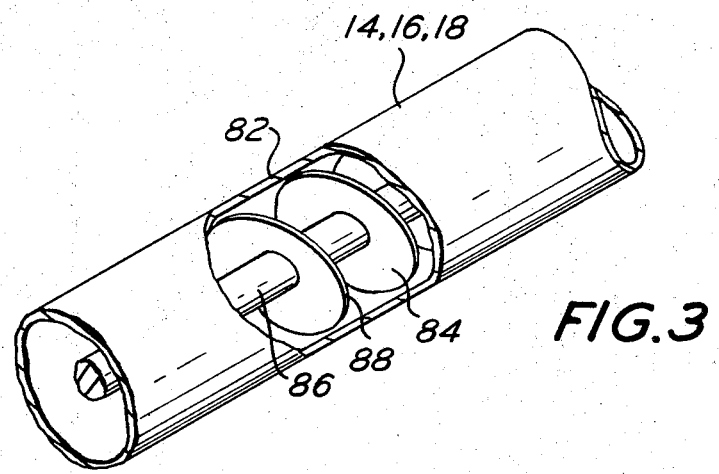

In this manner, the combustion gases flow over the pyrolytic retorts and exit into the flow pattern of the exhaust gases from steam generator 10 and generally flow the normal pattern of either being diverted for the flash drying operation of the sewage sludge or exiting to the atmosphere through electrostatic precipitators (not shown). The purpose of the exhaust gases flowing across retorts 14, 16 and 18 is to provide a range of approximately 932° F.–1,650° F. temperature for the promotion of the pyrolytic action within a particular retort. The end purpose of the pyrolytic actuation of the pulverized solid waste is to retrieve by-products in the form of light and heavy oils, ammonium sulphate, combustable gas and chars. The system flow diagram of recovery system 115 after leaving the retorts is schematically shown in FIG. 2 and will be described in following paragraphs. A fragmented view of the construction of retorts 14, 16 and 18 are shown in FIG. 3. In general, the retorts are cylindrical in nature having retort walls 82 made of ceramic, stainless steel, or some like material able to accept the high temperature exhaust gases without causing corrosive action thereon. In addition, a wall having a high thermal conductivity is preferable in order to transfer the heat generation to the pulverized solid waste passing through a particular retort. In order to facilitate the continuous motion of the pulverized solid waste to a particular retort, a variable speed worm drive mechanism 84 is seen internal to each of the retorts. Drive rod 86 is rotationally activated and drives blades 88 in a manner such that the pulverized solid waste is driven longitudinally along the axis direction of each of retorts 14, 16 and 18.

Retorts 14, 16 and 18 are connected by conduits 90 and 92 as is shown in FIG. 3. In this manner, it is seen that the pulverized waste material may be longitudinally moved along retort 14, transferred to retort 16 through conduit 90 and passed in an opposing direction to the movement in retort 14 along a longitudinal path of retort 16 and finally transferred to retort 18 through conduit 92. The variable speed worm drive mechanism 84 in each of the retorts 14, 16 and 18 thereby insures a continuous motion of the pulverized material in a path through the conduits.

FIG. 3 represents a block flow diagram detailing the method of pyrolysis for converting municipal and industrial waste into valuable by-products. Refuse having the aforementioned density of 16–20 lbs. per cubic foot in its pulverized state is introduced into a two stage shredder 94 and passes pneumatically to cyclone separator 96. The dust laden air then passes into low pressure blower 98 and bag filter 100 before collected dust particulate entrance through feeder 102 into the main line passing pulverized material from cyclone separator 96 through feeder 104 into first retort 14. Elements 94, 96, 98 and 100 comprise a cyclone and dust collection system which is well known in the art. The pulverized waste enters retort 14 and is longitudinally driven to retorts 16 and 18 as is shown through conduits 90 and 92. In its final pass from retort 18, the charred waste flows through feeder 106 onto a cooling conveyor 108. The charred material passing longitudinally on cooling conveyor 108 enters vibrating screen 110 where the char fines are recovered and directed to storage bin 112. Lowermost retort 19 has a longitudinal length in excess of retorts 14 and 16 in order to extend beyond boiler 10 walls for ease of handling in passage to conveyor 108.

Gases and unscreened particulates that accumulate through the pyrolytic action and within retorts 14, 16 and 18 are vented into common manifold 114 which are then passed into tar trap 116 as is shown. The material is condensed in tubular condensors 118 after passage from tar trap 11 and pass into electrostatic precipitators 120 aligned in parallel fashion as is shown. Drain conduits 122 collect the residual material which is passed through elements 116, 118 and 120 as is detailed in FIG. 3. Steam is passed from tubular condensors 118 through steam lines 124 for venting purposes not important to the inventive concept.

The material then passes into ammonia scrubber 126 which passes fluid and gas through acid pump 130 for collection in retort 138. The collection within retort 138 is ammonium sulphate. The material is then further forced into $CO_2$ and $H_2S$ scrubbers 128 and respectively passed through caustic pumps 132 and 133 for collection of NaOh. The exhaust then goes to wet test meter 140 and into drying tube 142 as is shown. The exhaust from drying tube 142 passes to light oil condensor 144 where the light oils are retrieved. Particles from light oil retrieval condensor 144 pass to metering device or small wet test meter 146 and into gas sampling holder 148 where the BTU content of the gases are recorded. Excess gases are vented to the atmosphere from metering device 140 through the metering conduit 150.

The method of processing waste materials as herein described includes the steps of introducing solid waste material into combustion zone 12 of boiler or steam generator 10 as well as a suspension of comminuted waste material into zone 12 through suspension burning mechanism 22. The combination of solid waste material and suspended comminuted waste material is subjected to heat of combustion within zone 12. A portion of the comminuted waste material is further passed through pyrolysis system 26 within secondary zone 13 which lies contiguous to combustion zone 12. The comminuted waste material passes or is driven through retorts or conduits 14, 16 and 18 and is subjected to the temperatures of exhaust gases being emitted from combustion zone 12. The pulverized or comminuted waste material being driven through retorts 14, 16 and 18 within plenum chamber 34 releases volatile gases from the comminuted waste material which pass to recovery system 115 for recovery of specific chemical compounds of interest. In addition, the waste material in passing through retorts or conduits 14, 16 and 18 are charred and eventually recovered in storage bin 112 as is shown in FIG. 2.

Before introducing the solid waste material into charging hopper opening 52, removal of non-combustible material may be accomplished from the waste material by introducing a magnetic field or other like means not important to the inventive concept. Once introduced into hopper 50 and impinging on grate mechanism 20, the waste material is transported through combustion zone 12 and has applied thereto the heat of combustion. After passage through combustion zone 12, the combusted waste material is removed through lowermost opening passage 60 and onto endless conveyor 62 hence onto conveyor 66 for recovery of oxidized metals.

The method of operation of introducing the suspension of comminuted waste material into combustion zone 12 also includes the step of pulverized or comminuting or grinding the solid waste material introduced into hopper 68 in a manner such that it may be driven into zone 12 through suspension burning mechanism 22. The step of comminuting or pulverizing the solid waste material may include subjecting the material to a primary grinding operation followed by introduction into a magnetic field and finally into a secondary grinding operation. Once the waste material has been ground to a predetermined acceptable size limitation, such may then be injected into combustion zone 12 through mechanism 22. The comminuted waste material is input into zone 12 suspended in a predetermined volumetric flow of air as determined by fuel blower 70 which mixes air with the incoming pulverized waste material and passes such to spreader 72. Spreader 72 sprays the pulverized waste material through zone 12 and directs the waste fuel onto the solid waste material being combusted on grate mechanism 20. In actual practice, it has been found that 80 percent by weight of the suspended comminuted waste material is combusted before reaching grate mechanism 20 and approximately 20 percent of comminuted waste material is therefore combusted on grate 20.

A portion of the pulverized waste material is diverted from suspension burning mechanism 22 and input into pyrolysis system 26 in order to take advantage of the heat release within combustion zone 13. The comminuted waste material is driven in a predetermined path within secondary zone 13 to aid in transporting heat to the pulverized waste material. Heating, as such, takes place through a combination of convection and conduction heat transfer from exhaust gases passing from combustion zone 12 and actuates pyrolysis on the moving comminuted material. As has been described, the waste material is circulated through a plurality of tubular conduits 14, 16 and 18 contained within plenum chamber 34. Variable speed worm drive 84 forces a continuous movement of comminuted waste material through the appropriate conduits. Gases and particulates of the waste materials passing through pyrolysis system 26 are passed to external recovery system 115 where specific chemical compounds are recovered for further use.

In addition to suspension burning, grate burning and pyrolysis as has been described, sludge derived from sanitary sewage may also be incorporated into combustion zone 12 of steam generator 10. Such sludge may be pre-dried to a moisture content approximating 15 percent before insertion through dry sludge burning mechanism 24 as is seen in FIG. 1. Mechanism 24 pneumatically forces the sludge into zone 12 in order to permit combustion therein.

In the manner described, there has been shown a system and method for processing waste materials within a combustion zone 12 of steam generator 10. The system includes grate burning, suspension burning and incorporates dried sludge burning to create a substantially self-sustaining burning operation within steam generator 10. Additionally, the system provides for pyrolysis of comminuted waste material from exhaust heat of combustion to aid in recovery of predetermined chars and chemical compounds while at the same time when used in a boiler allows for steam generation gained from the processing of such waste materials.

What is claimed is:

1. A method of processing waste material within a steam generating unit including the steps of:
   a. introducing solid waste material into a combustion zone of said steam generating unit;
   b. introducing a suspension of a first portion of comminuted waste material into said combustion zone, said introduction of said first portion of comminuted waste material being simultaneous with said introduction of said solid waste material;
   c. passing a second portion of said comminuted waste material through a zone of said steam generating unit contiguous to said combustion zone;
   d. incorporating externally pre-dried sludge derived from sanitary sewage into said combustion zone; and,
   e. subjecting said first portion of said suspension, said solid waste material, and said pre-dried sludge to a heat of combustion.

2. The method of processing waste materials as recited in claim 1 where the step of passing a second portion of said comminuted waste material includes the step of subjecting said second portion of said comminuted waste material to predetermined temperature ranges of exhaust gases from said combustion zone, said temperature of said exhaust gases within said predetermined temperature ranges being sufficient to char said second portion of said comminuted waste material.

3. The method of processing waste materials as recited in claim 2 where the step of subjecting said second portion of said comminuted waste material to said exhaust gas includes the step of locating said second portion of said comminuted waste material in the path of said exhaust gases from said combustion zone to provide said comminuted material char.

4. The method of processing waste materials as recited in claim 3 where the step of subjecting said waste material to said exhaust gas temperatures includes the step of releasing volatile gases from said comminuted waste material being charred.

5. The method of processing waste material as recited in claim 1 where the step of introducing solid waste material into said combustion zone is preceded by the step of classifying said solid waste material into combustible and non-combustible material external to said combustion chamber, said combustible material being introduced into said combustion chamber of said steam generating unit.

6. The method of processing waste material as recited in claim 1 where the step of introducing solid waste material into said combustion zone includes the step of transporting said waste material through said combustion zone supported on a moveable grate system, said grate system having a first grate moveably activated within said combustion zone co-acting with a second grate passing external to said steam generating unit for removal of said combusted waste material.

7. The method of processing waste material as recited in claim 1 where the step of introducing a suspension of a first portion of said comminuted waste material includes the steps of:
   a. pulverizing a portion of said solid waste material to a predetermined particulate size defining said first portion of said comminuted waste material;
   b. injecting said first portion of comminuted waste material into said combustion zone; and,
   c. forcing said first portion of said comminuted waste material into said combustion zone suspended in a predetermined volumetric flow of air sufficient to achieve positive combustion.

8. The method of processing waste materials as recited in claim 7 where the step of injecting said pulverized waste material includes the step of spraying said pulverized waste material into said combustion zone.

9. The method of processing waste materials as recited in claim 8 where the step of spraying includes the step of directing said sprayed material onto said solid waste material being combusted in said combustion zone.

10. The method of processing waste materials as recited in claim 9 where the step of directing said sprayed material includes the step of forcing said sprayed material through a portion of said combustion zone before said sprayed material impinges said solid waste being combusted in said combustion zone.

11. The method of processing waste materials as recited in claim 1 including the additional step of introducing a flow of said second portion of said comminuted waste material in a predetermined path through a combustion chamber containing said combustion zone for transporting heat to said solid waste material.

12. The method of processing waste materials as recited in claim 11 where the step of introducing a flow of said comminuted waste material includes the step of heating said waste material through a combination of convection and conduction heat transfer from exhaust gases passing from said combustion zone of said combustion chamber to permit pyrolytic action on said comminuted waste material.

13. The method of processing waste materials as recited in claim 12 where the step of heating said comminuted waste material includes the step of positioning said path of said waste material in the flow path of said exhaust gases.

14. The method of processing waste materials as recited in claim 13 were the step of positioning said path of said comminuted waste material includes the step of locating said waste material path external to said combustion zone of said chamber.

15. The method of processing waste materials as recited in claim 12 where the step of heating said waste material includes the step of circulating said waste material through a plurality of tubular conduits within said combustion chamber.

16. The method of processing waste materials as recited in claim 15 including the step of passing an effluent of said waste material from at least one of said tubular conduits to an external recovery system.

17. The method of processing waste materials as recited in claim 1 where the step of incorporating sludge includes the step of pneumatically forcing said sludge into said combustion zone.

18. The method of processing waste materials as recited in claim 1 where the step of incorporating said pre-dried sludge is preceded by the step of drying moisture laden sludge to a predetermined moisture content.

19. A waste material processing system within a steam generating unit, comprising:
   a. means for introducing solid waste material into a combustion zone of said steam generating unit;
   b. means for introducing a suspension of a first portion of comminuted waste material into said combustion zone for simultaneously burning said solid wast material and said first portion of said comminuted waste material within said combustion zone;
   c. means for circulating a second portion of said comminuted waste material through a zone of said steam generating unit contiguous to said combustion zone; and;
   d. means for incorporating pre-dried sludge derived from sanitary sewage into said combustion zone within said steam generating unit.

20. The waste material processing system as recited in claim 19 where said circulation means includes:
   a. a conduit positioned within said zone being contiguous to said combustion zone for passage of said second portion of said comminuted waste material therethrough; and,
   b. drive means within said conduit for forcing linear movement of said second portion of said comminuted waste material contained within said conduit.

21. The waste material processing system as recited in claim 20 where said circulation means includes a plurality of conduits continuously linked for movement of said comminuted waste material in opposing directions within said secondary zone.

22. The waste material processing system as recited in claim 21 where at least one of said conduits passes external to said secondary zone for removing said comminuted waste material in the form of char from said circulation means after passage of said comminuted waste material through said secondary zone.

23. The waste material processing system as recited in claim 21 where said plurality of conduits are contained within a plenum chamber located within said secondary zone, said plenum chamber having a pair of openings for entrance and exit of exhaust gases passing from said combustion zone.

24. The waste material processing system as recited in claim 19 where said means for introducing said suspension of comminuted waste material includes means for injecting said comminuted waste material into said combustion zone suspended in a predetermined volumetric flow of air.

25. The waste material processing system as recited in claim 24 where said injection means includes means for spraying said suspension onto said solid waste material being combusted in said combustion zone.

26. The waste material processing system as recited in claim 19 where said means for introducing solid waste material includes means for transporting said solid waste material through said combustion zone.

* * * * *